Patented May 13, 1941

2,241,641

UNITED STATES PATENT OFFICE 2,241,641

PROCESS OF AND COMPOSITION FOR CLARIFYING WATER

Rowland R. Magill, Atlanta, Ga., assignor to Joseph F. Gunther and Gerard K. Gunther, both of University City, Mo.

No Drawing. Application May 29, 1939,
Serial No. 276,418

19 Claims. (Cl. 210—23)

This invention relates to processes of and compositions for clarifying water, and more particularly to the removal of suspended or colloidal materials from turbid water.

Heretofore in the treatment of turbid water to remove suspended or colloidal materials, it has been the usual practice to employ aluminum sulphate, commonly known as alum, as a coagulating agent.

While the alum process of clarifying turbid water has long been in general use, it has many disadvantages. Relatively large quantities of alum are usually required and the time of treatment is relatively long. Moreover, alum tends to harden the water and this may require special treatment to obtain the desired softness in the treated water. Alum is also difficult to store as it tends to cake or harden.

An object of this invention, therefore, is to provide an inexpensive and efficient process and composition for very effectively clarifying turbid water.

Another object of this invention is to provide a process for clarifying turbid water wherein the time of treatment is relatively short and only a small quantity of treating material is required to very effectively clarify the water.

A further object is to provide a process of clarifying turbid water which produces a clear water appreciably softer than the original untreated water.

More specifically stated, an object is to accomplish all of these results in a simple, unitary, and entirely feasible commercial process.

With the foregoing and other objects in view, the invention comprises the novel processes and compositions hereinafter more specifically described, but it is to be understood that the invention extends to changes, variations and modifications within the scope of the claims hereunto appended.

In the clarification of turbid water in accordance with my invention, the water may be treated with lime as is usual in the use of clarifying compositions. The quantity of lime required depends partly upon the amount of lime in the water to be treated, and also upon the amount of dissolved solids in the water that may combine with my composition while in solution to form a flock. The quantity of lime required, therefore, varies with the nature of the water to be treated.

As an example of the quantity of lime employed, I will state that three or four parts of lime may be used with one-fourth to one part of my composition. However, this example is merely given to illustrate the quantity of lime that may be employed under average conditions. In the treatment of certain waters, such as well water, little or no lime may be required.

I have discovered that by mixing a composition including sodium chloride commonly known as salt, and sodium aluminate, with a turbid water containing lime a coagulated suspension is formed which quickly precipitates with itself suspended or colloidal materials in the water.

While sodium chloride and sodium aluminate may be used alone with lime to clarify turbid water, I have found that the reaction between the sodium chloride, sodium aluminate and lime may be accelerated and that the coagulant forming properties thereof is greatly improved by the addition of a metallic salt, or salts, whose oxides are insoluble in water and act catalytically with the sodium chloride, and sodium aluminate. These metallic salts may be ammonium ferric sulphate or an alkaline salt of silicate soluble in water, such as sodium meta-silicate or sodium ortho-silicate, or combinations of said salts.

I have found that different water conditions require a variance in my composition, and also in the lime required to combine with it to form the flock. I will refer to compositions which I have found satisfactory in treating various water conditions.

In using sodium chloride and sodium aluminate, the sodium chloride may be 80 to 10 percent of the composition and sodium aluminate 20 to 90 percent thereof. When using ammonium ferric sulphate, the composition may comprise sodium chloride, sodium aluminate and 4 to 20 percent ammonium ferric sulphate. When an alkaline salt of silicate soluble in water is employed, the composition may include sodium chloride, sodium aluminate, and 4 to 10 percent of said alkaline salt.

In addition to the foregoing examples, I have found that when the composition includes sodium chloride, sodium aluminate, 4 to 20 percent ammonium ferric sulphate, and 4 to 10 percent of an alkaline salt of silicate soluble in water, the resultant product is very effective for treating turbid water having considerable variation in its constituents.

As an illustration of suitable compositions, I will refer to the following specific examples:

Example 1

| | Per cent |
|---|---|
| Sodium chloride | 70 |
| Sodium aluminate | 20 |
| Ammonium ferric sulphate | 5 |
| Sodium ortho-silicate, or sodium meta-silicate | 5 |

Example 2

| | Per cent |
|---|---|
| Sodium chloride | 50 |
| Sodium aluminate | 30 |
| Ammonium ferric sulphate | 10 |
| Sodium ortho-silicate, or sodium meta-silicate | 10 |

Example 3

| | Per cent |
|---|---|
| Sodium chloride | 80 |
| Sodium aluminate | 10 |
| Ammonium ferric sulphate | 5 |
| Sodium ortho-silicate, or sodium meta-silicate | 5 |

The foregoing examples are merely given to illustrate the invention and are not intended to limit the same, as the proportions and materials may vary in accordance with the nature of the water to be treated and the results desired.

As heretofore stated, the quantity of lime that may be employed depends upon the nature of the water to be treated and may vary accordingly. If lime is employed, the time at which it is added to the water is not critical, as the water may be treated with lime either before or after the addition of my composition to the water. If desired, powdered magnesium may be substituted for the lime, either wholly or in part.

As a comparison of my process with the usual alum process, I will refer to separate treatments of water having a turbidity of 300. In each test, lime was added at the rate of 4 grains to each gallon of water to be treated. In one test, 4 grains of alum was added to each gallon of lime-treated water. In the other test, instead of using alum, one grain of the composition set forth in Example No. 1 was added to each gallon of lime-treated water. The water in each test was then agitated for thirty minutes, and during this agitation it was observed that the rate of coagulation was greater in the test where my composition was employed than in the alum treatment. After the agitation was stopped, the flock resulting from my composition was more pronounced, in greater volume, and precipitated faster than in the alum treatment. Moreover, upon testing the waters resulting from each treatment, it was found that the water treated in accordance with my invention was considerably softer than the water treated with alum.

It will, therefore, be observed that in using my process a relatively small quantity of the composition is required to provide a more effective and faster clarifying treatment than in the alum treatment. In addition to the foregoing very desirable results, my process also has the important advantage of producing a softer water than the original water to be treated, whereas the alum process increases the hardness of the water.

I claim:

1. The process of clarifying turbid water which comprises adding to the water to be treated a coagulant-forming composition including sodium chloride and sodium aluminate.

2. The process of clarifying turbid water which comprises mixing with the water to be treated powdered magnesium and a coagulant-forming composition including sodium chloride and sodium aluminate.

3. The process of clarifying turbid water which comprises adding to the water to be treated a coagulant-forming composition including sodium chloride, sodium aluminate, and a metallic salt whose oxide is insoluble in water and acts catalytically with sodium chloride and sodium aluminate.

4. The process of clarifying turbid water which comprises mixing a composition including sodium chloride and sodium aluminate with a turbid water containing lime to form a coagulated suspension which precipitates with itself impurities in the water.

5. The process of clarifying turbid water which comprises mixing a composition including sodium chloride, sodium aluminate and ammonium ferric sulphate, with a turbid water containing lime to form a coagulated suspension which precipitates with itself impurities in the water.

6. The process of clarifying turbid water which comprises mixing a composition including sodium chloride, sodium aluminate, and an alkaline salt of silicate soluble in water with a turbid water containing lime to form a coagulated suspension which precipitates with itself impurities in the water.

7. The process of clarifying turbid water which comprises mixing a composition including sodium chloride, sodium aluminate, and sodium ortho-silicate with a turbid water containing lime to form a coagulated suspension which precipitates with itself impurities in the water.

8. The process of clarifying turbid water which comprises mixing a composition including sodium chloride, sodium aluminate, sodium meta-silicate with a turbid water containing lime to form a coagulated suspension which precipitates with itself impurities in the water.

9. The process of clarifying turbid water which comprises mixing a composition including sodium chloride, sodium aluminate, ammonium ferric sulphate, and an alkaline salt of silicate soluble in water with a turbid water containing lime to form a coagulated suspension which precipitates with itself impurities in the water.

10. A composition for clarifying turbid water comprising sodium chloride and sodium aluminate.

11. A composition for clarifying turbid water comprising sodium chloride, sodium aluminate, and ammonium ferric sulphate.

12. A composition for clarifying turbid water comprising sodium chloride, sodium aluminate, ammonium ferric sulphate, and an alkaline water soluble salt of silicate.

13. A composition for clarifying turbid water comprising sodium chloride, sodium aluminate, ammonium ferric sulphate and sodium ortho-silicate.

14. A composition for clarifying turbid water comprising sodium chloride, sodium aluminate, ammonium ferric sulphate and sodium meta-silicate.

15. A composition for clarifying turbid water comprising 80 to 10 percent sodium chloride and 20 to 90 percent sodium aluminate.

16. A composition for clarifying turbid water comprising sodium chloride, sodium aluminate and 4 to 20 percent ammonium ferric sulphate.

17. A composition for clarifying turbid water comprising sodium chloride, sodium aluminate, and 4 to 10 percent of an alkaline salt of silicate soluble in water.

18. A composition for clarifying turbid water comprising sodium chloride, sodium aluminate, 4 to 20 percent ammonium ferric sulphate, and 4 to 10 percent of an alkaline salt of silicate soluble in water.

19. A composition for clarifying turbid water comprising approximately 70 percent sodium chloride, 20 percent sodium aluminate, 5 percent ammonium ferric sulphate and 5 percent of an alkaline salt of silicate soluble in water.

ROWLAND R. MAGILL.